United States Patent [19]

Naruke et al.

[11] Patent Number: 5,193,895
[45] Date of Patent: Mar. 16, 1993

[54] WARNING LIGHT

[75] Inventors: Naoki Naruke; Nobuo Matsukawa; Mitsuhiko Nakano, all of Shizuoka, Japan

[73] Assignee: Koito Manufacturing Co., Ltd., Tokyo, Japan

[21] Appl. No.: 642,738

[22] Filed: Jan. 17, 1991

[30] Foreign Application Priority Data

Jan. 18, 1990 [JP] Japan ................................. 2-2690[U]
Dec. 13, 1990 [JP] Japan ................................. 2-410461

[51] Int. Cl.$^5$ ............................................. B60Q 1/26
[52] U.S. Cl. .................................. 362/80; 362/83.3; 362/249; 362/800
[58] Field of Search ............... 362/80, 83.3, 249, 252, 362/800, 103, 205, 184, 61, 80.1, 223

[56] References Cited

U.S. PATENT DOCUMENTS

| | | | |
|---|---|---|---|
| 1,906,131 | 4/1933 | Baylis | 362/94 |
| 2,844,810 | 7/1958 | Steele, Jr. | 362/80 |
| 2,875,324 | 2/1959 | Camp et al. | 362/398 |
| 2,901,593 | 8/1959 | McNally | 362/80 |
| 3,452,190 | 6/1969 | Senseman | 362/80 |
| 3,714,414 | 1/1973 | Sternius . | |
| 3,894,225 | 7/1975 | Chao . | |
| 3,995,152 | 11/1976 | Chao et al. . | |
| 4,173,035 | 10/1979 | Hoyt . | |
| 4,189,709 | 2/1980 | Gosswiller | 362/223 |
| 4,442,478 | 4/1984 | Stansbury | 362/80 |
| 4,733,335 | 3/1988 | Serizawa et al. | 362/80 |
| 4,740,872 | 4/1988 | Chou | 362/184 |
| 4,761,720 | 8/1988 | Solow | 362/249 |
| 4,774,434 | 9/1988 | Bennion | 362/800 |
| 4,845,600 | 7/1989 | Matsumura et al. | 362/80 |
| 4,924,209 | 5/1990 | Kao | 362/80 |
| 4,953,065 | 8/1990 | Kao | 362/80 |
| 4,972,173 | 11/1990 | Raciti | 362/61 |
| 4,972,303 | 11/1990 | Machida et al. | 362/80 |
| 5,103,382 | 4/1992 | Kondo et al. | 362/800 |

FOREIGN PATENT DOCUMENTS

| | | | |
|---|---|---|---|
| 217592 | 5/1958 | Australia | 362/80 |
| 998656 | 10/1976 | Canada | 362/80 |
| 0326668 | 11/1988 | European Pat. Off. . | |
| 3148843 | 12/1981 | Fed. Rep. of Germany . | |
| 76041617 | 12/1989 | Fed. Rep. of Germany . | |
| 52-126543 | 9/1977 | Japan . | |
| 2227828 | 8/1990 | United Kingdom | 362/223 |

Primary Examiner—Ira S. Lazarus
Assistant Examiner—Y. Quach
Attorney, Agent, or Firm—Sughrue, Mion, Zinn, Macpeak & Seas

[57] ABSTRACT

A plurality of chip-type light-emitting elements are mounted on a flexible printed circuit board, and a resin lens is provided in front of the light-emitting elements. A warning light further has, on the back side, a fixing member such as a double-sided adhesive tape and flexible magnetic sheet. The warning light having such a structure is typically installed on a side face, such as a fitting face, of a vehicle's door, and is turned on/off by a switch which is made on/off in link motion with opening/closing of the door.

28 Claims, 8 Drawing Sheets

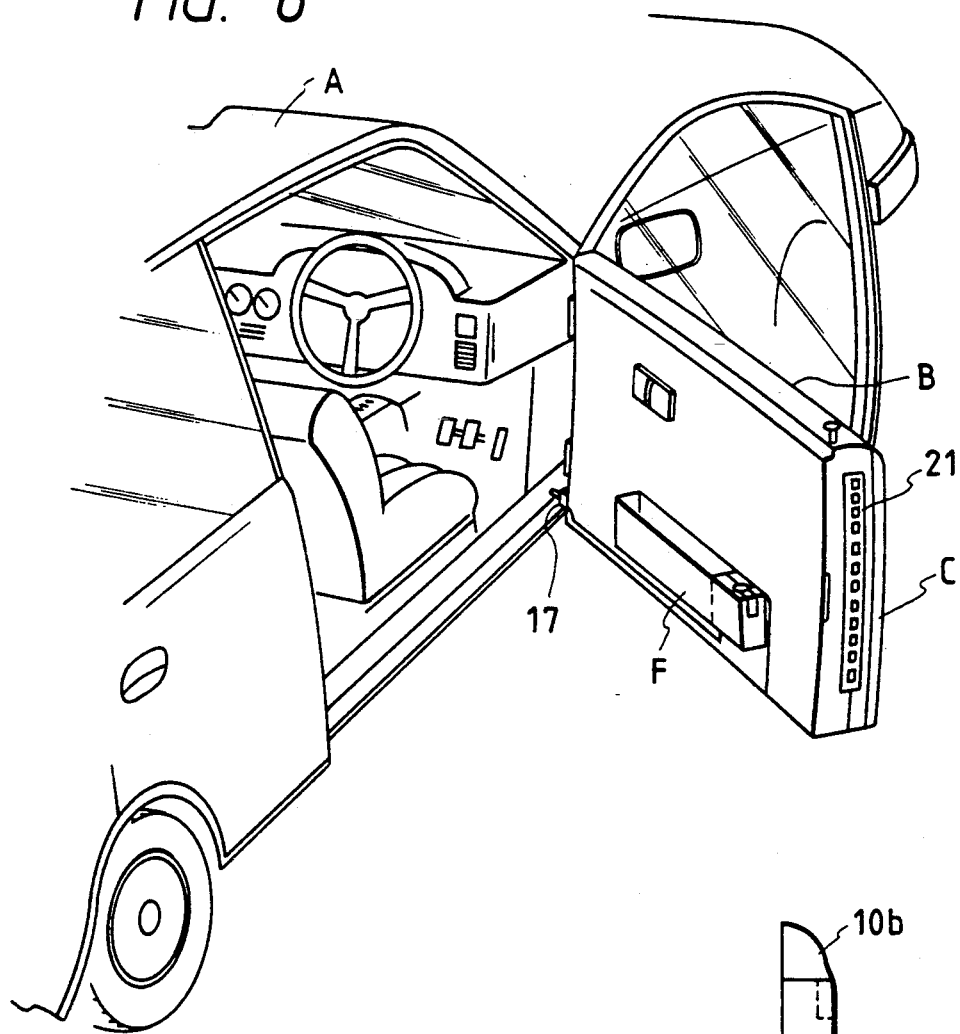
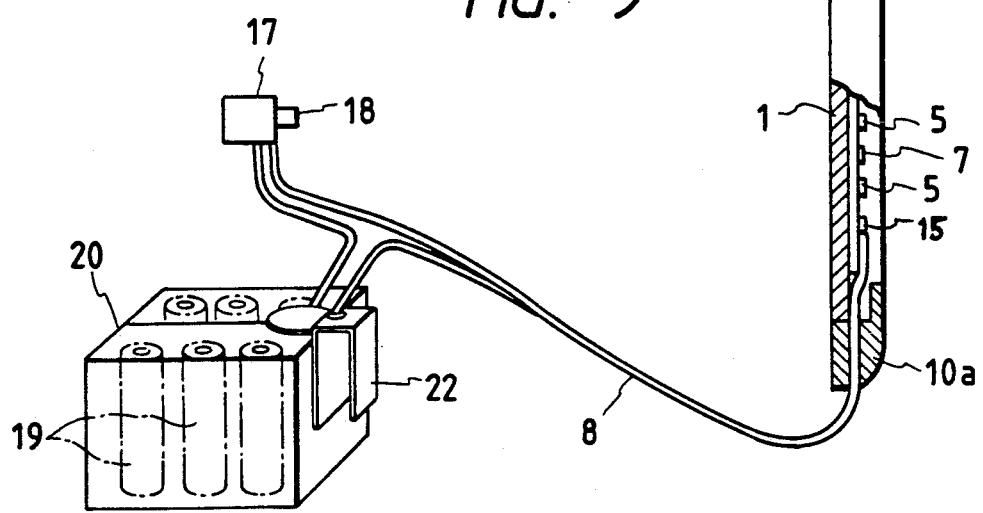

000
WARNING LIGHT

BACKGROUND OF THE INVENTION

The present invention relates to a warning light typically fixedly or removably attached to a side face, such as a fitting face, of a door of a vehicle such as a car for notifying drivers of following vehicles of opening of the vehicle's door.

FIG. 1 is a view, partly a vertical cross-sectional view, showing a conventional warning light of the above kind, which is disclosed in Japanese Utility Model Application Unexamined Publication No. Sho. 52-126543. Light body 63 is placed inside of hole 62 which is provided in side fitting face 61 of door 60 of a car. Lens portion 64 is projected from hole 62. Lamp 65 starts emitting light or flashing when door 60 is opened.

However, because of the structure in which the relatively large light body 63 is mounted in hole 62, the above warning light has the following disadvantages. First, side fitting face 61 of door 60 must be worked to form hole 62. Light body 63 occupies part of the inside space of door 60, and thereby reduces the inside space available for vehicular equipment such as a power window driving mechanism, which constitutes an obstruction for vehicle construction. In developing a new type vehicle, it may be necessary to re-design the size of the warning light and its installation position, which would be cumbersome and difficult. Further, it takes considerable time to perform maintenance, inspection and repair of the warning light.

SUMMARY OF THE INVENTION

An object of the present invention is to provide a thin, light-weight warning light which can typically be installed on a side face, such as a fitting face, of a vehicle's door with the warning light deformed (bent) so as to conform to the shape of the side face, and without the necessity of special working on a vehicle body, and which can automatically start emitting light or flashing in response to the opening of the door, for example at dusk or night, or when the vehicle is in a tunnel.

In a warning light according to the invention, a plurality of chip-type light-emitting elements are mounted on a printed circuit board, and a resin lens or light-transmissive elastic sheet is provided at least in front of the light-emitting elements. The warning light is typically installed on a side face, such as a fitting face, of a vehicles's door, and is turned on/off by a switch which is made on/off in link motion with opening/closing of the door.

With the above construction, the warning light can easily be installed on a vehicles's door, and can notify, for example, following cars' drivers of the door opening by the lighting or flashing of the light-emitting elements. Since there is no need of special working on a vehicle body, the warning light can easily be installed at any desired location of a vehicle.

BRIEF DESCRIPTION OF THE DRAWINGS

FIG. 8 shows how the warning light is installed on a door of a car;

FIG. 9 shows a push-button switch and a battery case which are connected to the warning light;

DESCRIPTION OF THE PREFERRED EMBODIMENTS

In the following, various embodiments of a door-opening warning light for a vehicular use according to the present invention will be described.

FIGS. 2(a)–6(b) show a warning light for a vehicular use according to a first embodiment of the invention.

Figure 1:
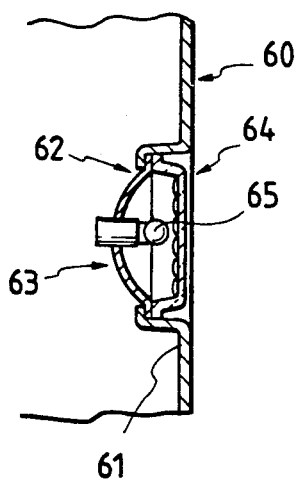
FIG. 1 is a view, partly a vertical cross-sectional view, showing a conventional door-opening warning light for a vehicular use.
Figure 2A:
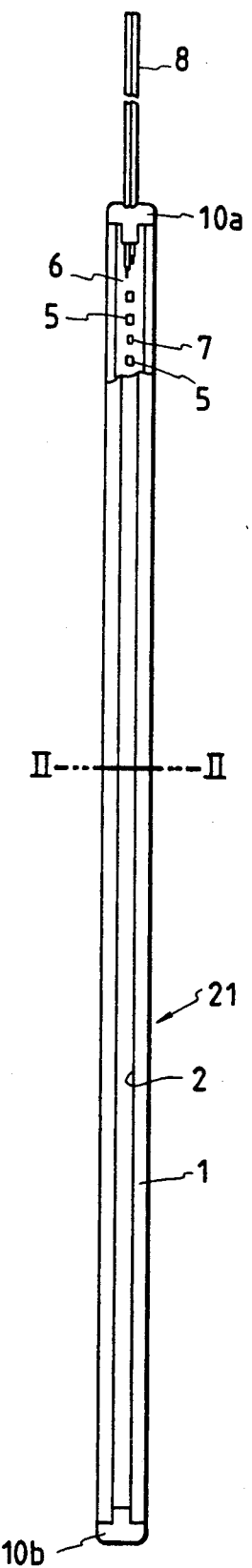
FIG. 2(a) is a partially broken plan view of a first embodiment of the warning light of the invention.
Figure 2B:
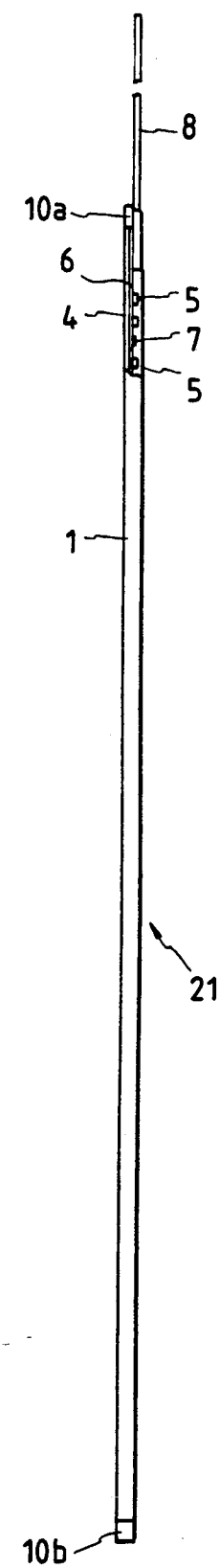
FIG. 2(b) is a partially broken side view.
Figure 3A:
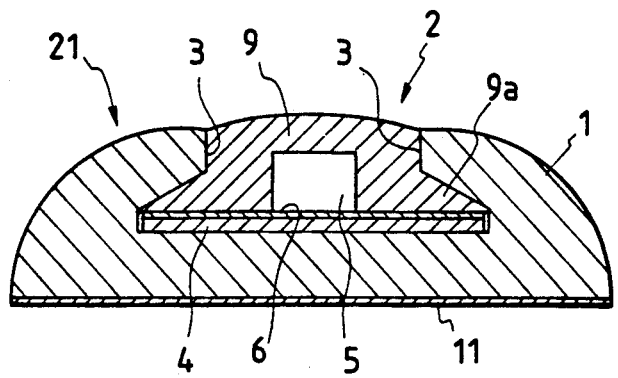
FIG. 3(a) is a lateral cross-section view taken along lines II—II in FIG. 2(a)
Figure 3B:
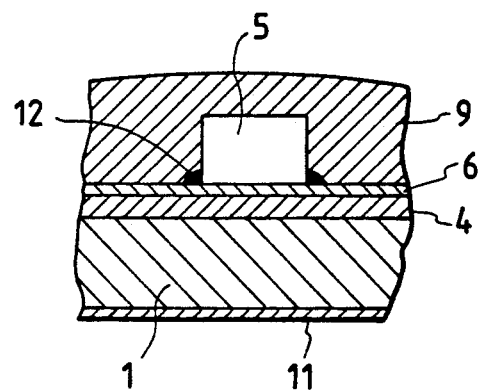
FIG. 3(b) is a side view showing soldering of a light-emitting element to a circuit board 6.

In FIG. 3(a), reference numeral 1 denotes a narrow, ribbon-like light body made of synthetic resin such as urethane rubber. Opening 2, from which light is to be emitted, is formed in light body 1 along its longitudinal direction. The bottom portion of opening 2 is elongated in the lateral direction, and the top portion thereof is made narrow, defined by vertical side edges 3 of light body 1. Metal plate 4, such as an aluminum plate having a shape-holding function, is placed on the inner surface of light body 1. When warning light 21 is deformed (bent) so as to conform to the shape of the fitting face of a vehicle's door, metal plate 4, by virtue of its shape-holding function, serves to hold the correspondingly deformed shape of light body 1. Metal plate 4 is fixed to the inner surface of light body 1, receiving an elastic force from light body 1 when tightly confined therein. Adhered to the top surface of metal plate 4 is narrow, flexible printed circuit board 6. As shown in FIG. 3(b), a plurality of chip-type light-emitting elements 5 are mounted in alignment on circuit board 6, being connected thereto by soldering. Reference numeral 12 denotes solder. Flexible printed circuit board 6 may be fixed to metal plate 4 partially, for example, only at part of the both sides thereof or at every predetermined interval, such that the other part of circuit board 6 remain unfixed to metal plate 4. This structure will reduce bending stress to circuit board 6 when light body 1 is deformed (bent), eliminating a possibility of electrical faults of light-emitting elements 5 mounted on circuit board 6.

Figure 4:
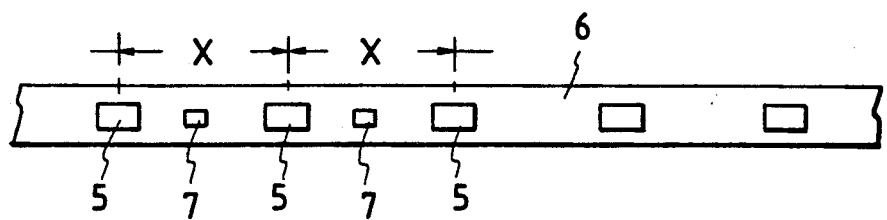
FIG. 4 shows the arrangement of light-emitting elements and resistors on the circuit board.

As shown in FIG. 4, light emitting elements 5 are aligned on flexible printed circuit board 6 at almost the same interval X to obtain uniform brightness over the entire warning light 21. Resistors 7 may be placed between light-emitting elements 5 where necessary. Reference numeral 8 denotes lead wires which are soldered to circuit board 6 and led out from the end of light body 1 for connection to a power source (FIGS. 2(a) and 2(b)).

Again in FIG. 3(a), elastic resin lens 9 is formed by pouring a molding material, such as milk white silicone, into opening 2. Part of the molding material enters the elongated bottom portion of opening 2 to form edges 9a, which serve, after their solidification, to prevent resin lens 9 from escaping from light body 1.

Resin lens 9 serves not only to diffuse and output light emitted from light-emitting elements 5, but also to prevent water from entering opening 2. Since the light diffusion by resin lens 9 enhances the uniform light output profile, the number of light emitting elements 5 to be mounted in light body 1 can be reduced.

Figure 5A:
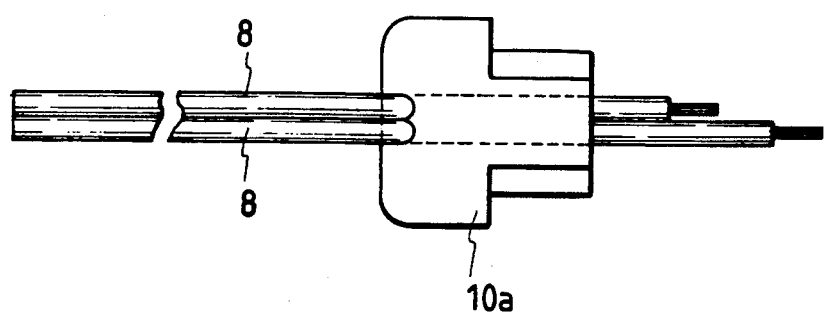
FIGS. 5(a) through 6(b) show spacers 10a and 10b.
Figure 5B:
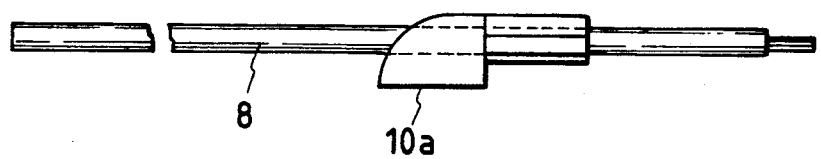
Figure 6A:
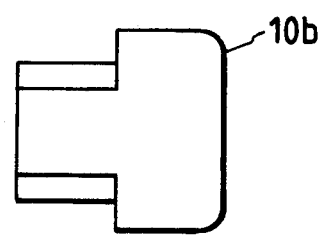
Figure 6B:
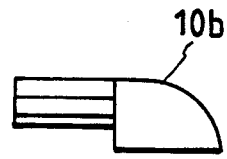

Having the same cross-sectional view as FIG. 3(a) at any portion including light-emitting element 5, warning light 21 of the invention may be cut at a certain position so as to obtain a desired length which is in accordance with the size of the installation portion of a door or the like. Spacer 10a as shown in FIGS. 5(a) and 5(b) or spacer 10b as shown in FIGS. 6(a) and 6(b) may be used at the cutting portion to terminate the warning light 21. Spacer 10a has holes for introducing lead wires 8.

Figure 7:
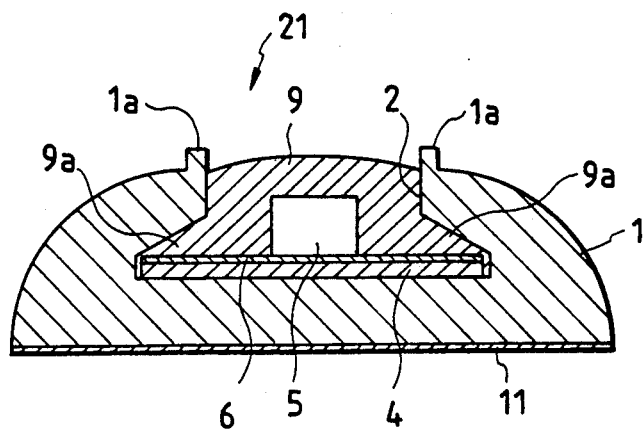
FIG. 7 is a cross-sectional view showing a warning light according to a modification of the first embodiment.

FIG. 7 is a cross-sectional view showing a modification of the first embodiment, in which vertical walls 1a are added to light body 1 at its top portions. Walls 1a serve not only to prevent the molding material from flowing out of opening 2 when the molding material is poured to form resin lens 9, but also protect the surface of resin lens 9. Further, the top portion of light body 1 may be protruded and the thickness of resin lens 9 be increased to eliminate the possibility that resin lens 9 and circuit board 6 escape from opening 2 when light body 1 is deformed to install warning light 21 on the fitting face of a vehicle's door.

Figure 11:
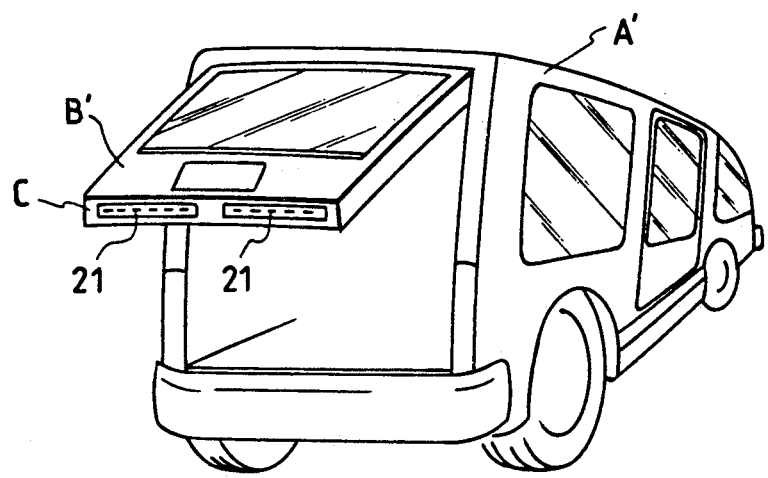
FIG. 11 shows how the warning light is installed on a hatchback door of a station wagon-or-van-type-vehicle.

Warning light 21 further has, on its back surface, fixing member 11 made of a double-side adhesive tape, flexible magnetic sheet, or the like, and can be attached to fitting face C of door B of car A (FIG. 8) or hatchback door B' of station wagon-or van-type car A' (FIG. 11). The employment of the flexible magnetic sheet presents an advantage that warning light 21 can be easily attached to and removed from door B. Alternatively, warning light 21 may be fixed to fitting face C using screws.

Light-emitting elements 5 are turned on/off by the operation of a push-button switch, electrical sensor switch, etc. which is made on/off in link motion with the opening/closing of door B. If desired, a flashing circuit (FIG. 9) may be incorporated inside or outside light body 1 to enable light-emitting elements 5 to flash. Further, warning light 21 may be constructed such that the lighting or flashing of light-emitting elements 5 are automatically stopped after a lapse of a predetermined period. Warning light 21 may be linked with a lighting switch of car A so that warning light 21 operates only while the lighting switch is on.

Figure 10:
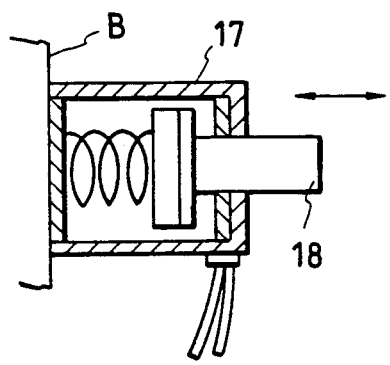
FIG. 10 shows the structure of the push-button switch.

An example of the push-button switch is shown in FIGS. 8, 9 and 10. As shown in FIG. 8, push-button switch 17 is installed on the front side face of door B. As shown in FIG. 10, switch 17 is made on or off in accordance with projection (door opening) or retreat (door closing), respectively of switch piece 18.

FIG. 9 also shows battery case 20 containing batteries 19 which are provided separately from a car battery. Battery case 20 may be installed in the end portion of door box F (FIG. 8) and fixed by fitting hook 22 to the end wall of box F. The separate provision of batteries 19 presents an advantage that warning light 21 can be installed at any desired location of car A, facilitating the use of warning light 21. Alternatively, a car battery may be connected to warning light 21 through a cigarette lighter hole, etc.

Figure 12:
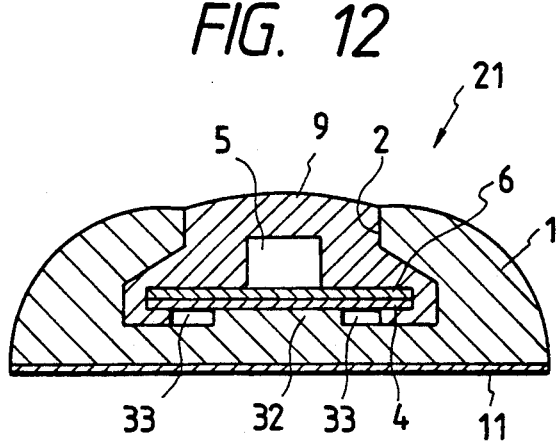
FIG. 12 is a cross-sectional view showing a warning light according to a second embodiment of the invention.

FIG. 12 is a cross-sectional view showing a warning light according to a second embodiment of the invention. In this embodiment, one rib or several parallel ribs 32 are formed on the inner bottom of light body 1 along the longitudinal direction. Each rib 32 may be either continuous or discrete in the longitudinal direction. By the existence of ribs 32, spaces 33 are formed between metal plate 4 and the inner bottom surface of light body 1. Resin lens 9 is formed in the same manner as the first embodiment shown in FIG. 3, i.e., by pouring the molding material into opening 2. Ribs 32 may be formed so as to contact with metal plate 4 in a band-like area or a line-like area.

Figure 13:
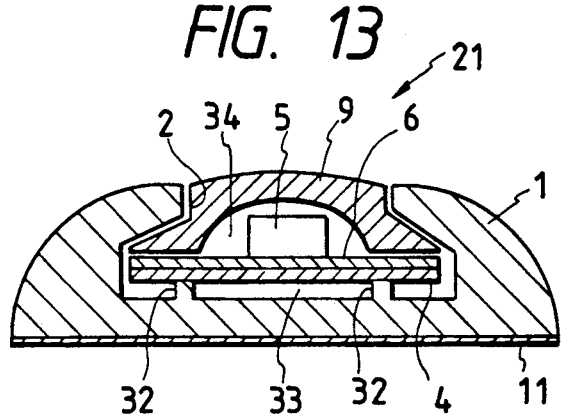
FIG. 13 is a cross-sectional view showing a warning light according to a modification of the second embodiment.

As a modification of the second embodiment, as shown in FIG. 13, resin lens 9 is separately formed, and then inserted into light body 1 so that space 34 is formed between resin lens 9 and flexible printed circuit board 6 on which light-emitting elements 5 and resistors 7 are mounted.

In the above warning lights 21 of FIGS. 12 and 13, the existence of spaces 33 and/or 34 permits the reduction of the stresses acting on the contacting portions between circuit board 6 and light-emitting elements 5, and fixing member 11, when light body 1 is deformed in accordance with the shape of the fitting face of door B of car A, reducing a possibility of electrical faults.

Figure 14:
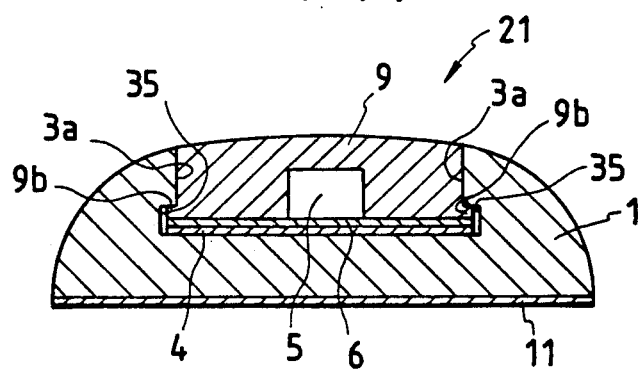
FIG. 14 is a cross-sectional view showing a warning light according to a third embodiment.

FIG. 14 is a cross-sectional view showing a warning light according to a third embodiment of the invention. A description will be made with respect to the parts different from the first or second embodiment. As shown in FIG. 14, grooves 35 extending along the longitudinal direction are formed in light body 1 under its vertical side edges 3a. Metal plate 4, to which circuit board 6 is fixed, is fitted into and held by grooves 35. Further, since the molding material flows into grooves 35 to form edges 9b of resin lens 9, resin lens 9 can be prevented from escaping from light body 1. This structure of light body 1 permits metal plate 4 and circuit board 6 to be installed into body 1 more easily.

Figure 15:
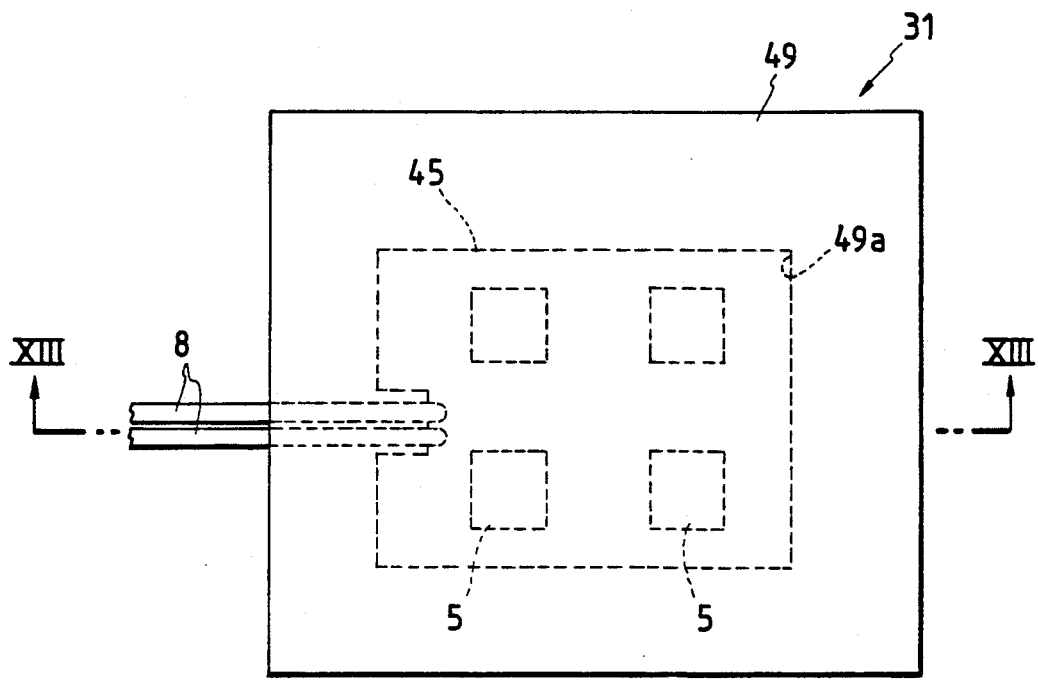
FIGS. 15 through 17(b) show a warning light according to a fourth embodiment of the invention.
Figure 16:
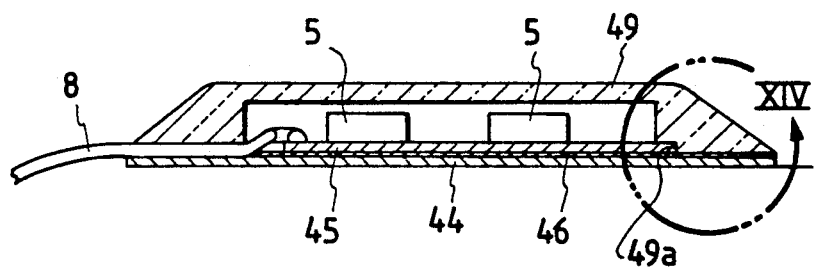
Figure 17A:
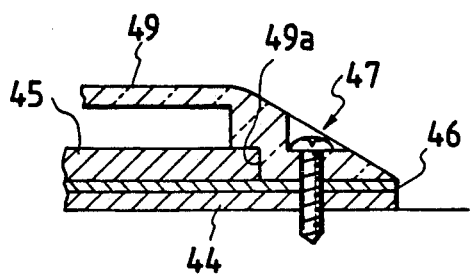
Figure 17B:
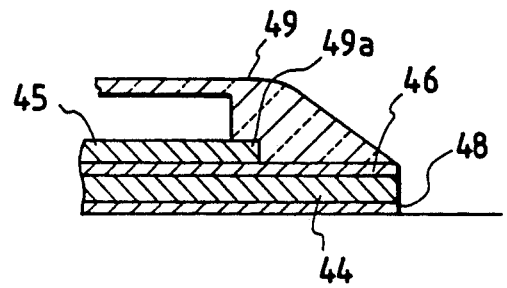

FIGS. 15 through 17(b) show a warning light according to a fourth embodiment of the invention. More specifically, FIG. 15 is a plan view; FIG. 16 is a sectional view taken along line XIII in FIG. 15; and FIGS. 17(a) and 17(b) are enlarged sectional views showing part XIV in FIG. 16.

In this embodiment, the back surface of resin lens 49 is covered with sheet member 44 made of an aluminum plate, resin plate, vinyl sheet, etc. That is, body 1 of the first through third embodiments is not used. Step 49a is formed around inner bottom edge 49a of resin lens 49, and hard printed circuit board 45 having a plurality of chip-type light-emitting elements 5 is fitted into step 49a. Sheet member 44 is adhered and fixed to the bottom surfaces of circuit board 45 and resin lens 49 with adhesive member 46 such as a double-sided adhesive tape. Lead wires 8, whose ends are soldered to circuit board 45, are led out through a portion of the adhering boundary between resin lens 49 and sheet member 44. Warning light 31 of this embodiment may be fixed on door B, etc. of car A using screws 47 penetrating resin lens 49 and sheet member 44 (FIG. 17(a)), or using adhesive member/agent 48, such as a double-sided adhesive tape, adhered/coated on the back surface of sheet member 44.

Figure 18:
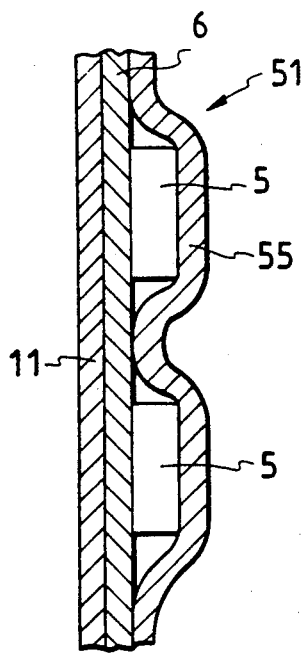
FIG. 18 is a longitudinal cross-sectional view showing a warning light according to a fifth embodiment of the invention.

FIG. 18 is a longitudinal cross-sectional view showing a warning light according to a fifth embodiment of the invention. In this embodiment, narrow, flexible printed circuit board 6, on which a plurality of chip-type light emitting elements 5 are mounted, is covered with light-transmissive elastic sheet 55 made of, e.g., silicone resin. Like the first through third embodiments, fixing member 11 made of a double-sided adhesive tape, flexible magnetic sheet, or the like is attached to the back surface of circuit board 6. Metal plate 4 (not shown) may be inserted between circuit board 6 and fixing member 11. Alternatively, warning light 51 may be fixed to door B using screws. Since both of circuit board 6 and fixing member 11 are flexible, warning light 51 can be fixed not only to a flat surface, but also to an uneven surface.

As a modification, warning light 51 of the fifth embodiment is simplified by replacing transmissive elastic sheet 55 with a flat, transmissive protection film.

Figure 19:
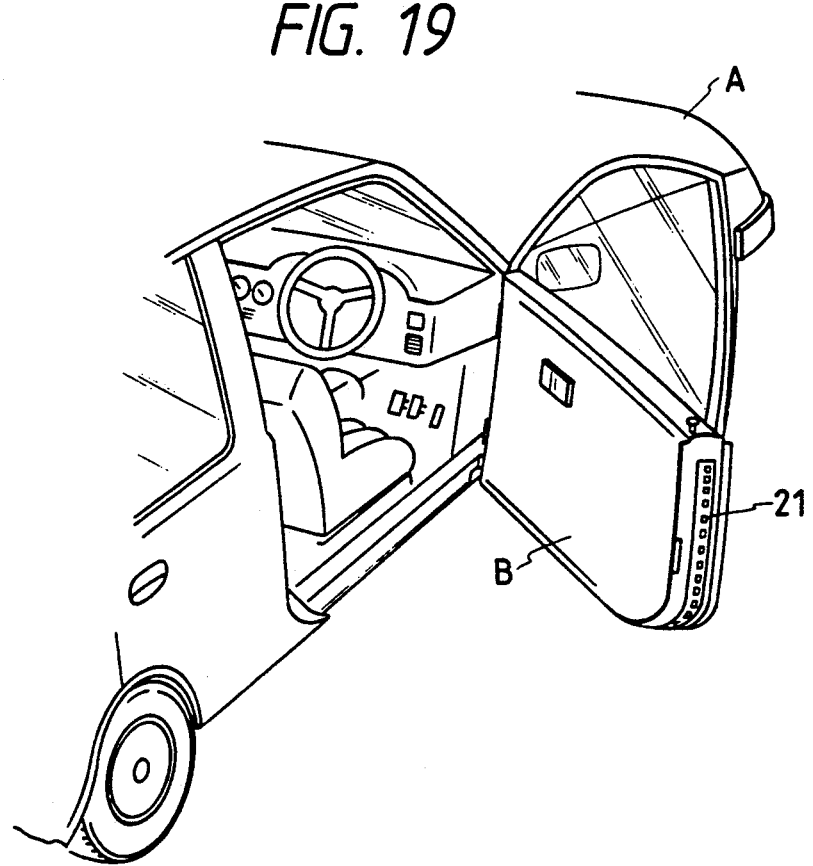
FIG. 19 shows another method of installing the warning light on a car's door.

FIG. 19 shows another method of the warning light installation. As shown in this figure, if the warning light 21 is installed on door B so that it extends to the bottom side of door B, the warning light 21 can also serve to illuminate a driver's feet.

With the construction described above, in the warning light of the invention, the light-emitting elements start emitting light continuously or flashing upon opening of a vehicle's door. Therefore, drivers of following cars or pedestrians can be notified of the door opening for example at dusk or night, or in a tunnel, preventing collisions from behind, etc.

The use of the chip-type light-emitting elements can reduce the electric power consumption, presenting economical advantages such as a prolonged lifetime of a power source. If a small battery is used as the power source, it can be installed on a door of an existing car and, therefore, the warning light can be installed more easily.

The use of the flexible printed circuit board provides an advantage that the warning light can be made to conform to the shape and size of the fitting face of a vehicle's door by cutting the warning light to a desired length or by deforming it. Since the light-emitting elements are mounted on the flexible printed circuit board, disconnection faults hardly occur, and the warning light can be manufactured very easily and, as a result, at low cost.

The warning light according to the invention is not limited to the above embodiments, but can be modified appropriately within the scope of the invention.

The warning light of the invention can be used in applications other than vehicles. For example, the warning light may be attached to the seat of a bicycle or motorcycle, or to the clothing of a road construction worker to draw attention from drivers and pedestrians. Such versatility of the warning light of the invention is due to its advantages such as detachability, light weight and thin structure.

What is claimed is:

1. A warning light comprising:
   a flexible printed circuit board;
   a plurality of light-emitting elements arranged and mounted on the flexible printed circuit board;
   a light-transmissive member provided at least in front of the light-emitting elements, said light-transmissive member being made of resin;
   a body member for fixing said flexible printed circuit board within said body member and housing said light-transmissive member, said body member extending along the length of and retaining within a notch-like opening therein said flexible printed circuit board and said light transmissive member;
   a fixing member provided on a back surface of said body member for fixing the warning light to a mounting surface with said warning light conforming to said mounting surface, said light-transmissive member having edge portions extending no further than corresponding outermost edge portions of said body member; and
   a switch for turning on/off the light-emitting elements.

2. The warning light according to claim 1, wherein the light-transmissive member is formed into a convex lens.

3. The warning light according to claim 1, wherein a back surface of the flexible printed circuit board is partially in contact with a bottom surface of said body member to form a space therebetween.

4. The warning light according to claim 1, further comprising a metal plate provided between the flexible printed circuit board and the fixing member.

5. The warning light according to claim 4, wherein a back surface of the metal plate is partially in contact with a bottom surface of said body member to form a space therebetween.

6. The warning light according to claim 1, wherein the light-transmissive member has a sheet-like form, and is in close contact with the flexible printed circuit board and the light-emitting elements.

7. The warning light according to claim 1, wherein the light-emitting elements are of chip-type.

8. The warning light according to claim 1, wherein the plurality of light-emitting elements are arranged in a line.

9. The warning light according to claim 1, wherein the plurality of light emitting elements are arranged at a constant interval.

10. The warning light according to claim 1, wherein the fixing member comprises a double-sided adhesive tape.

11. The warning light according to claim 1, wherein the fixing member comprises a magnetic sheet.

12. The warning light according to claim 1, further comprising a flashing circuit connected to the flexible printed circuit board, for flashing the light-emitting elements while the switch is made on.

13. The warning light according to claim 1, further comprising a battery connected to the flexible printed circuit board and the switch, and provided separately from a vehicle battery.

14. The warning light according to claim 15, wherein the switch turns on/off the light-emitting elements in link motion with opening/closing of a door of a vehicle.

15. The warning light according to claim 1, wherein the fixing member fixes the warning light to a side face of a door of a vehicle.

16. A warning light comprising:
a flexible printed circuit board;
a plurality of light-emitting elements arranged and mounted on the flexible printed circuit board;
a light-transmissive member provided at least in front of the light-emitting elements;
a bendable metal plate having a shape-holding function;
a fixing member provided on a back surface of the warning light, with said bendable metal plate disposed between said fixing member and said flexible printed circuit board, for fixing the warning light to a mounting surface with said warning light being bent to conform to said mounting surface; and
a switch for turning on/off the light-emitting elements.

17. The warning light according to claim 16, wherein the light-transmissive member is made of resin.

18. The warning light according to claim 17, wherein the light transmissive member is formed into a convex lens.

19. The warning light according to claim 16, further comprising a body member for fixing the flexible printed circuit board within the body member, and for housing the light-transmissive member.

20. The warning light according to claim 19, wherein the light-transmissive member is made of resin.

21. The warning light according to claim 20, wherein the light-transmissive member is formed into a convex lens.

22. The warning light according to claim 16, wherein the light-emitting elements are of a chip type.

23. The warning light according to claim 16, wherein the plurality of light-emitting elements are arranged in a line.

24. The warning light according to claim 23, wherein the plurality of light emitting elements are arranged at a constant interval.

25. The warning light according to claim 16, wherein the fixing member comprises a double-sided adhesive tape.

26. The warning light according to claim 16, wherein the fixing member comprises a magnetic sheet.

27. The warning light according to claim 16, further comprising a flashing circuit connected to said circuit board flexible printed for flashing the light-emitting elements while the switch is turned on.

28. The warning light according to claim 16, further comprising a battery connected to the flexible printed circuit board and the switch, and provided separately from a vehicle battery.

* * * * *